W. H. TUCKER.
GRASS PLOT FOUNDATION.
APPLICATION FILED JAN. 6, 1917.
1,224,692.
Patented May 1, 1917.
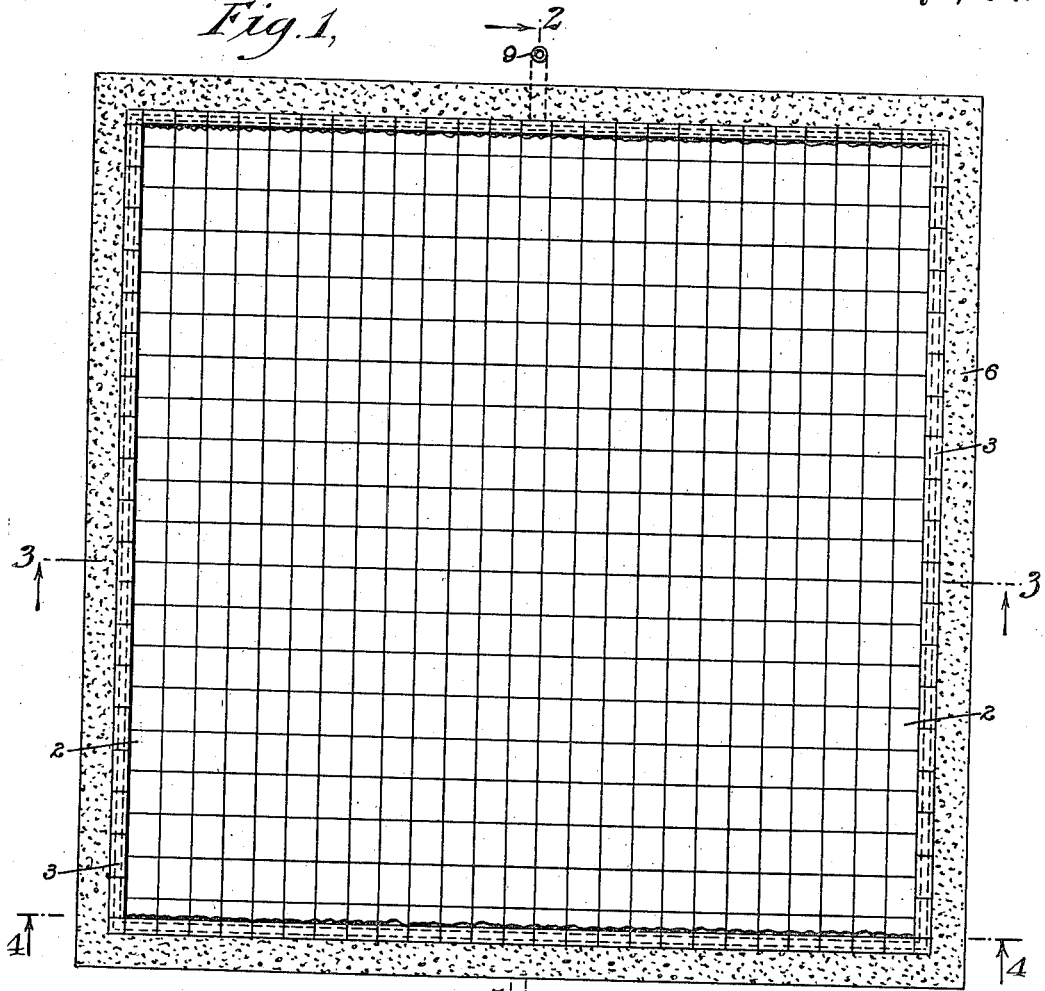
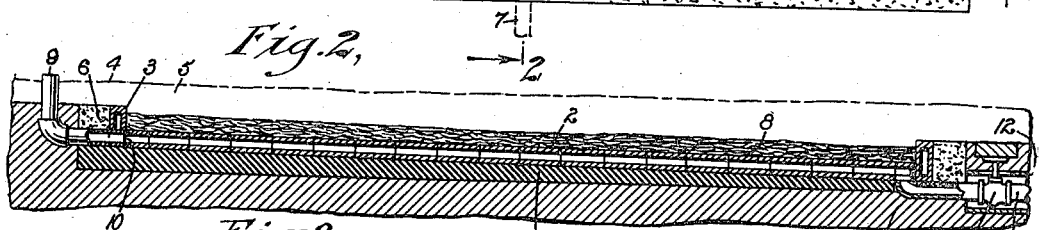
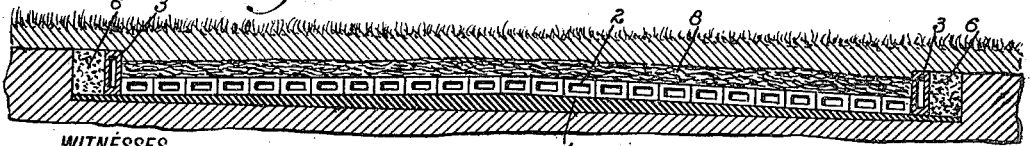
WITNESSES
Edw. Thorpe
A. Kitchin
INVENTOR
William H. Tucker
BY Munn & Co
ATTORNEYS

UNITED STATES PATENT OFFICE.

WILLIAM H. TUCKER, OF DOBBS FERRY, NEW YORK.

GRASS-PLOT FOUNDATION.

1,224,692.  Specification of Letters Patent.  Patented May 1, 1917.

Application filed January 6, 1917. Serial No. 140,907.

*To all whom it may concern:*

Be it known that I, WILLIAM H. TUCKER, a citizen of the United States, and a resident of Dobbs Ferry, in the county of Westchester and State of New York, have invented a new and Improved Grass-Plot Foundation, of which the following is a full, clear, and exact description.

This invention relates to foundations for grass plots and particularly to a foundation construction for golf putting greens capable of use in many climates, particularly in a southern climate.

The object in view is to provide an improved construction whereby a desirable grade of grass may be grown which is especially good for golf putting greens.

Another object in view is to provide a construction for putting greens which will always insure a proper covering of grass in a proper condition for use in the southern climates as well as in northern climates.

In the accompanying drawings:—

Figure 1 is a plan view of the foundation disclosing an embodiment of the invention, the two upper layers being removed for better illustrating the construction.

Fig. 2 is a section through Fig. 1 on line 2—2.

Fig. 3 is a section through Fig. 1 on line 3—3.

Fig. 4 is a section through Fig. 1 on line 4—4.

In providing grass for golf putting greens it has been found that the stolonifera grasses are the best for this purpose, and as this grass may be grown in the northern States in the natural condition of the earth and climate, an ordinary well prepared soil is all that is usually necessary. However, in the southern States, or in any hot climate, this particular grass will not grow at all, or at least it will grow in a very poor manner. In order to adapt this grass to southern climates it is necessary to provide artificially certain conditions whereby the grass will be properly supplied with moisture and the roots will not become unduly heated. In fact, the idea of the present invention is to minimize and equalize the heat of the soil and to allow as even a temperature of soil as possible consistent to that which is required for the development of the grass above mentioned, which grass is very desirable for what may be termed ideal putting greens, or in fact, all pleasure turfs in southern climates.

In the accompanying drawing it will be seen that the ground has been removed so as to provide a hollow or recessed space as large as the green desired, said recess being of any depth, as for instance, twenty inches or more, or, if desired, less, though ordinarily it could not be very much less. After the recess or wall has been dug a layer 1 of clay is provided on which a stratum 2 of hollow tile is placed, said tile being preferably cemented together and also preferably provided with a coating of cement on the upper surface so as to be substantially waterproof. Entirely around the layer or stratum 2 of tile is arranged a wall 3 of hollow tile which extends up to near the upper line 4 of the top soil 5. Surrounding the wall 3 is an outer wall 6 of cinders or other porous material which is designed to receive the water from the surrounding earth and form a passageway for said water or seepage, whereby said water or seepage is directed to the outlet pipe 7. Arranged on top of the stratum or layer 2 of tile is a stratum or layer 8 of sod, peat-bog, fiber or humus or other porous material, said layer preferably extending to near the top of the wall 3 so as to present a member which will act somewhat on the order of a sponge for holding water. On top of the layer 8 is arranged the layer 5 of top soil which may be of any desired thickness. The layer 5 is usually of sufficient thickness to cover the walls 3 and 6 and allow the grass to properly grow thereto and thereby make a continuous lawn.

In arranging the tile 2 in position the center thereof is slightly elevated, as shown in Fig. 3, so that any excess water striking the layer 2 will gravitate toward the side walls 3. As shown in Fig. 2, the layer 2 is also inclined from the upper end, where the air pipe 9 is arranged, to the lower end where the outlet pipe 7 is arranged. The row of tiles at the upper edge is broken, as indicated at 10, and also the lower row of tiles is broken at 11, whereby water entering the air inlet may pass into the various openings in the tiles 2 and thereby clean and cool said layer or stratum. Also, air may circulate freely through this stratum and produce a cooling effect. In addition to having the drainage laterally or sidewise, as shown particularly in Fig. 3, the parts are arranged so as to drain from the center toward the end having the pipe 7, as shown in Fig. 2, and the end having the pipe 7 is also inclined toward the center, as shown in Fig. 4, whereby the water may be directed to the pipe 7 and from thence led to any point for disposal, as for instance, a ravine. A valve 7' is arranged in the pipe 7 so that the pipe may be shut off and all of the water within the walls 3 retained. This is necessary during dry spells in order that the stratum 8 may continually feed water to the top soil. In case of rains or an undesirable amount of water in the plot, valve 7' may be opened and the excess water will pass through the top soil, layer 8, along the tile layer 2 and will eventually gravitate to the discharge outlet pipe 7. The surface water passing to the center wall 6 will eventually find its way to the discharge pipe 12 and through the discharge pipe to any suitable point of disposal. It will be noted that the water passing downwardly from the top soil through layer 8 will saturate said layer and by reason of the particular structure of said layer the same will retain a large part of the water, or at least a sufficient quantity to provide a supply to the top soil during dry weather or a dry period.

In the southern climates there are long periods of time when the weather is very dry and unless the grass is constantly supplied with water it will not properly grow. As this is important if the plot of grass is to be used as a golf putting green, some other means is necessary. By providing the spongy or absorbing layer 8, means have been provided which will supply moisture to the top soil and, consequently, to the grass growing thereon so that it will only be necessary to water the plot occasionally. It is to be noted that too much water is undesirable as well as too little water. The foundation structure permits of the discharge of excess water and at the same time presents a structure which will retain a sufficient quantity of water to maintain the grass in a healthy condition for an appreciable period after each watering operation. In addition, the arrangement of the top soil and layer 8, with the other parts, presents a sort of climatic condition especially adapted to stolonifera grasses, as the temperature remains approximately the same at all times below the surface and in a somewhat cooled condition, so that the grass may properly thrive.

What I claim is:

1. A golf putting green comprising a stratum of material impervious to water and provided with a plurality of passageways whereby water or air may circulate therethrough, a water absorbing material arranged on said impervious layer to an appreciable depth and designed to act as a sponge for retaining a predetermined amount of water, a layer of top soil arranged above said layer of absorbing material whereby moisture is continually supplied to the grass on the top soil, a wall of material impervious to water surrounding said impervious stratum, and mechanically operated means for controlling the flow of water from the upper surface of said impervious stratum.

2. A golf putting green comprising a foundation, a hollow tile stratum on said foundation arranged at such an angle as to allow the water to drain therefrom, means for connecting said tile together so as to present an impervious surface, a hollow wall surrounding said tile, a porous wall surrounding said hollow wall, a layer of absorbent material arranged on said tile, a layer of top soil on said last mentioned layer, an air tube communicating with the opening in said tile, and a discharge tube communicating with the opposite end of the opening in said tile.

3. A golf putting green comprising a wall of cinders, a drainage pipe connected with said wall whereby the outside surface water will pass from said wall of cinders to said pipe and thereby avoid the space within said wall, a top soil coating within said wall and overlying the same, a porous stratum arranged below said top soil in communication with said drainage pipe whereby the water placed within said cinder wall will be retained by said porous stratum to the absorbing capacity thereof and the remaining part will be discharged out said pipe.

4. A golf putting green comprising a clay foundation, a cinder wall surrounding said foundation and contacting on the outer edge thereof, a drainage pipe in communication with said cinder wall, a stratum of material impervious to water arranged on said clay foundation, one end of said stratum being broken away for allowing water to flow therefrom into said cinder wall and from thence to said drainage pipe, a second wall arranged adjacent said cinder wall formed of material impervious to water whereby water cannot pass through the cinder wall into the space surrounded by said impervious wall, a layer or stratum of absorbent material arranged on said impervious stratum, and a superimposed layer of top soil arranged on said absorbent stratum and overlapping said walls.

5. A golf putting green, comprising a foundation, a hollow tile stratum on said foundation arranged at such an angle as to allow the water to drain therefrom, means for connecting said tile together so as to present an impervious surface, a wall surrounding said tile, a layer of absorbent material arranged on said tile, a layer of top soil on said last mentioned layer, an air tube communicating with the opening in said tile, and a discharge tube communicating with the opposite end of the opening in said tile.

WILLIAM H. TUCKER.